Nov. 22, 1949     M. WHITED     2,489,065
AIR POWER LIFT

Filed July 19, 1946     2 Sheets-Sheet 1

INVENTOR.
MILO WHITED
BY
ATTORNEY

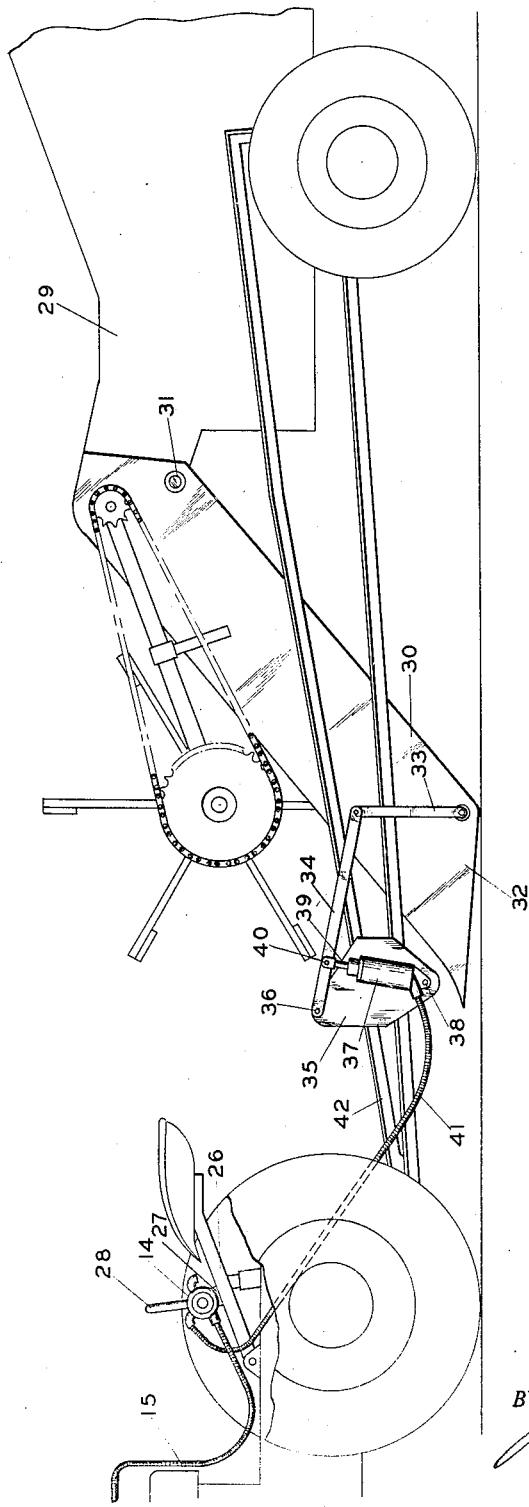

Patented Nov. 22, 1949

2,489,065

UNITED STATES PATENT OFFICE 2,489,065

AIR POWER LIFT

Milo Whited, Centralia, Wash., assignor of one-half to Clarence R. Whited, Centralia, Wash.

Application July 19, 1946, Serial No. 684,875

1 Claim. (Cl. 56—208)

This invention relates to air power lifts and is particularly adapted to be used on tractors and implements.

The primary object of the invention is to provide power lifts on tractors and implements that are portable in their nature, the air lift cylinders being transferable from the tractor to the implement or vice versa.

A further object of the invention is to mount an air compressor on the tractor that may be driven from the power take-off of the tractor or other take-off adapted to drive said compressor.

A still further object of the invention is the providing of controls for applying the air to the lifting cylinders that are conveniently located for the operator to manipulate.

By the use of air power lifts I eliminate many disadvantages encountered in hydraulic and mechanical lifts and I have provided the following advantages. By the use of air operated lifts I can locate my lifting cylinders at any desired location relative to the tractor or other implements.

Further advantages of my system are that an air compressor is available for supplying air for pumping the tires up on the tractor or implements, or for other uses, such as painting, spraying and so forth.

These and other incidental objects will be apparent in the drawings, specifications and claim.

Referring to the drawings:

Figure 2 shows the rear end of a tractor having the forward end of a combine connected thereto illustrating my new and improved air power lift cylinder mounted thereon for controlling the elevation of the header.

In the drawings:

Figure 1:
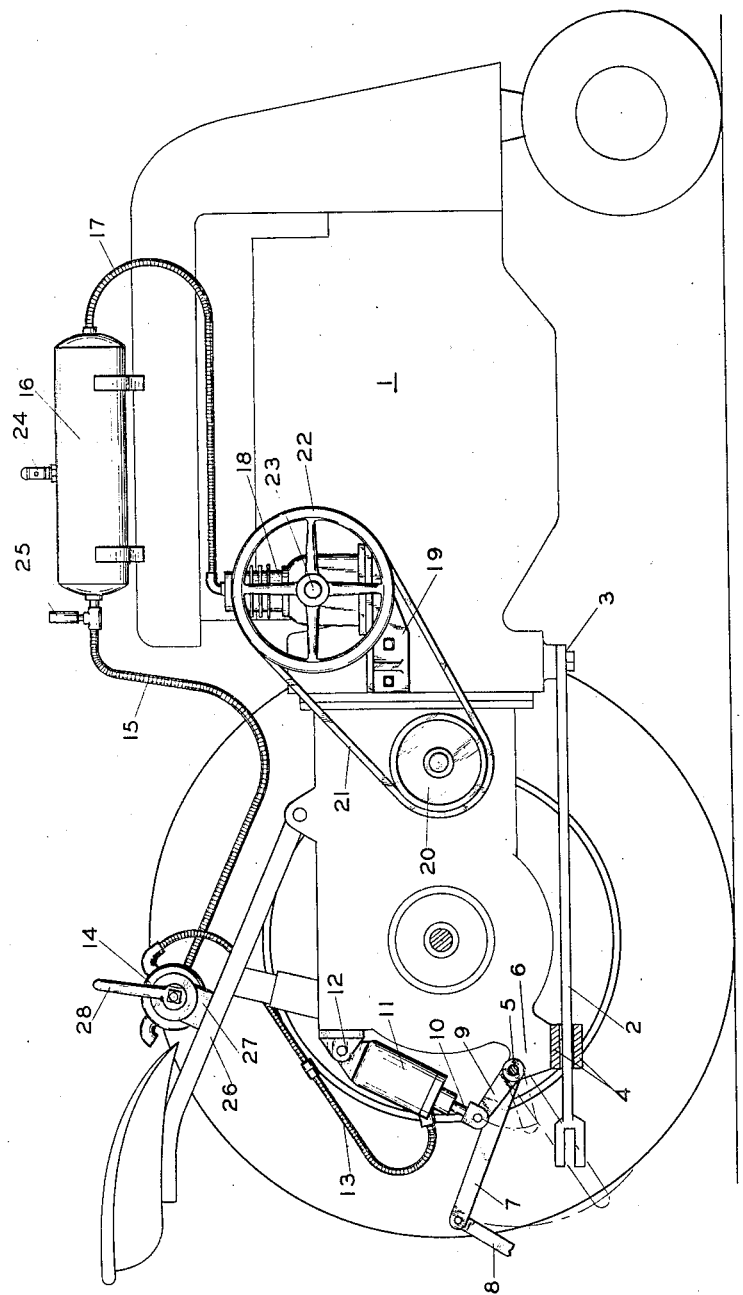
Figure 1 is a side view of a conventional wheel tractor having my new and improved air power lift installed thereon, parts of the tractor broken away for convenience of illustration.

A conventional tractor is indicated at 1, having the usual draw bar 2 pivotally mounted at 3 to the tractor and being supported at its rear by the cross bars 4. A cross shaft 5 is journalled within suitable brackets 6 and has the lever lift cranks 7 usually one located on either side of the tractor. These cranks are connected by suitable links 8 to whatever implement that is directly attached to the tractor, usually implements like cultivators, whose frames are rigidly secured to the tractor and not the draw bar. The link 8 connects to whatever raising mechanism the implement in question may happen to have.

The lever lift bars as stated before are keyed to the shaft 5, said shaft 5 is rotated by the arm 9 from the piston rod 10 of the air cylinder 11. The air cylinder 11 forming part of my invention is pivotally mounted to the tractor at 12 and receives its air operating supply through the hose line 13 from the control valve 14. The control valve 14 receives its air supply through the hose line 15 from the air supply tank 16, which is mounted to the tractor as best illustrated in Figure 1, and which in turn receives its air supply through the hose line 17 from the compressor 18. The compressor is mounted to the tractor 1 by a suitable bracket 19 and is driven from the power take-off pulley 20 of the tractor through the belt 21 and the pulley 22, which is keyed to the shaft of the compressor 23. A suitable blow off valve 24 is provided and also an air gauge 25 indicating the amount of air pressure to the operator of the tractor contained within the tank 16.

The control valve 14 is fixedly secured to the framework 26 of the tractor by any suitable means, as for instance the bracket 27. The control valve is operated by the lever 28 which is at a convenient location to the operator of the tractor.

In the operation of my new and improved power lift the operator works the lever 28 of the control valve 14 so as to permit air to flow through the valve into the hose line 13 and under the piston not here shown within the cylinder 11, raising the lever 9 by the piston rod 10 revolving the shaft 5 and the lever lift arms 7, together with the linkage 8 to whatever system of lever mechanism may be located on the implement not here shown, but secured to the tractor.

Figure 2 indicates another type of hook up employing my new and improved air lift, 29 indicating the forward end of a combine having the usual header 30 pivotally mounted at 31 to the combine. The lower end 32 is supported by the link 33 and the lever 34, which is pivotally mounted to the bracket 35 at 36. The air cylinder 37 is also pivotally mounted to the bracket 35 at 38 and has its piston 39 pivotally secured to the lever 34 at 40.

When it is desired to raise the lower end 32 of the header 30 the valve 14 is operated by the lever 28, which delivers air from the valve through the hose line 41 into the cylinder 37. This will raise the lever 34, together with the link 33 and the header 30.

One of the outstanding features of my new and improved air lift is that the operating cylinders, as for instance 37 can be located on the implement itself and receives air from the tractor pumping system. In cases of this kind the implement is usually connected by its tongue 42 to the draw bar 2 of the tractor.

I have illustrated two methods of operating my new and improved air power lift. First I described the operation of the same where the lifting cylinder was associated with the tractor itself for operating the lifting controls of the implement using an implement that is directly connected by suitable framework to the tractor and not the draw bar, but I would not wish to be limited to this exact hook up.

I have also shown the remote control system wherein the air operating cylinder is located on the implement as in Figure 2. By the use of air remote lifting cylinders are made possible with a minimum loss of operating air and by using air a cushion like operation is provided wherein shock has been reduced to a minimum in the operation of the lift and wherein any percentage of lift may be added with a fair degree of accuracy.

Further using the air system I have a unit on the tractor that I can use for other purposes as for instance the pumping up of tires, the spraying of trees or even painting.

I do not wish to be limited to the exact mechanical structure as illustrated in my drawing, as other mechanical equivalents may be substituted still coming within the scope of my claim.

What I claim as new is:

An attachment for a farm combine including a header pivotally mounted thereon, said attachment comprising a bracket attached to the side of the combine, a cylinder pivoted at its lower end to the bracket, a piston slidable in the cylinder, a lever fulcrumed at one end on the bracket and pivoted intermediate its ends to the outer end of the piston and disposed at right angles to the piston when in retracted position, the lever having at its other end means operatively connecting it to the header.

MILO WHITED.

REFERENCES CITED

The following references are of record in the file of this patent:

UNITED STATES PATENTS

| Number | Name | Date |
| --- | --- | --- |
| 1,648,154 | Steiger | Nov. 8, 1927 |
| 1,718,638 | Dirschauer | June 25, 1929 |
| 1,889,451 | Nepage | Nov. 29, 1932 |
| 1,931,815 | Conley | Oct. 24, 1933 |
| 2,156,571 | Lindgren et al. | May 2, 1939 |
| 2,318,409 | Millard et al. | May 4, 1943 |
| 2,383,689 | Silver | Aug. 28, 1945 |
| 2,402,449 | Rockwell | June 18, 1946 |
| 2,410,918 | Acton | Nov. 12, 1946 |